United States Patent
Ostwald

(10) Patent No.: US 11,485,060 B2
(45) Date of Patent: Nov. 1, 2022

(54) METHOD FOR PRODUCING A TRIM PART OF A MOTOR VEHICLE

(71) Applicant: Volkswagen Aktiengesellschaft, Wolfsburg (DE)

(72) Inventor: Stefan Ostwald, Soehlde (DE)

(73) Assignee: Volkswagen Aktiengesellschaft, Wolfsburg (DE)

(*) Notice: Subject to any disclaimer, the term of this patent is extended or adjusted under 35 U.S.C. 154(b) by 49 days.

(21) Appl. No.: 16/780,306

(22) Filed: Feb. 3, 2020

(65) Prior Publication Data

US 2020/0171725 A1 Jun. 4, 2020

Related U.S. Application Data

(63) Continuation of application No. PCT/EP2018/066471, filed on Jun. 20, 2018.

(30) Foreign Application Priority Data

Aug. 3, 2017 (DE) ............ 10 2017 213 453.4

(51) Int. Cl.
*B29C 45/17* (2006.01)
*B29C 45/37* (2006.01)
(Continued)

(52) U.S. Cl.
CPC ........ *B29C 45/174* (2013.01); *B29C 45/0025* (2013.01); *B29C 45/1703* (2013.01);
(Continued)

(58) Field of Classification Search
CPC ........ B29C 45/7312; B29C 2045/7343; B29C 2045/78
See application file for complete search history.

(56) References Cited

U.S. PATENT DOCUMENTS 5,972,276 A 10/1999 Yasuda et al.
5,993,723 A 11/1999 Tanaka et al.
(Continued)

FOREIGN PATENT DOCUMENTS

DE 197 39 522 A1 4/1998
DE 197 46 827 A1 4/1999
(Continued)

OTHER PUBLICATIONS

Stieler, Fluid Injection Technology brochure, pp. 1-24 with English translation (2010).
(Continued)

*Primary Examiner* — Benjamin A Schiffman
(74) *Attorney, Agent, or Firm* — Muncy, Geissler, Olds & Lowe, P.C.

(57) ABSTRACT

A method for producing a three-dimensionally shaped trim part of a motor vehicle, which has a visible side and a mounting side. A flowable material is injected with pressure into a chamber of an injection molding tool, which has at least two mold shells, which, when assembled, form the chamber with a negative mold of the trim part, wherein at least one first of the mold shells forms the visible side and at least one second of the mold shells forms the mounting side of the trim part. The material is hardened in the chamber. A gas pressure is generated that acts in a planar manner between the second mold shell and the material during the hardening. The hardened material is removed as a trim part from the chamber of the injection molding tool.

4 Claims, 1 Drawing Sheet

(51) Int. Cl.
    *B29C 45/73*    (2006.01)
    *B29C 45/00*    (2006.01)
    *B29L 31/30*    (2006.01)
    *B29C 45/78*    (2006.01)
    *B29C 45/14*    (2006.01)

(52) U.S. Cl.
    CPC .......... *B29C 45/37* (2013.01); *B29C 45/7312* (2013.01); *B29C 45/78* (2013.01); *B29C 2045/14213* (2013.01); *B29C 2045/7343* (2013.01); *B29L 2031/302* (2013.01); *B29L 2031/3005* (2013.01); *B29L 2031/3041* (2013.01)

(56) References Cited

U.S. PATENT DOCUMENTS

| | | |
|---|---|---|
| 9,242,400 B2 | 1/2016 | Fujita et al. |
| 10,596,738 B2 | 3/2020 | Ostwald et al. |
| 10,814,803 B2 | 10/2020 | Schelter |
| 2005/0127577 A1 | 6/2005 | Clark et al. |
| 2007/0176324 A1* | 8/2007 | Taylor ............... B29C 45/14549 264/327 |
| 2016/0279846 A1* | 9/2016 | Kong .................. B29C 44/0407 |

FOREIGN PATENT DOCUMENTS

| | | |
|---|---|---|
| DE | 103 04 305 A1 | 8/2004 |
| DE | 10 2005 038 469 A1 | 2/2007 |
| DE | 10 2014 202 001 A1 | 8/2015 |
| DE | 10 2016 213 963 A1 | 2/2018 |
| FR | 2 989 302 A1 | 10/2013 |
| JP | 2000-289073 A | 10/2000 |
| WO | WO 93/14918 A1 | 8/1993 |
| WO | WO 2013/191241 A1 | 12/2013 |
| WO | WO2016193384 A1 | 12/2016 |

OTHER PUBLICATIONS

Third Party Observation for correspondiing application No. EP20180733840 dated Feb. 18, 2021.

* cited by examiner

METHOD FOR PRODUCING A TRIM PART OF A MOTOR VEHICLE

This nonprovisional application is a continuation of International Application No. PCT/EP2018/066471, which was filed on Jun. 20, 2018, and which claims priority to German Patent Application No. 10 2017 213 453.4, which was filed in Germany on Aug. 3, 2017, and which are both herein incorporated by reference.

BACKGROUND OF THE INVENTION

Field of the Invention

The present invention relates to a method for producing a three-dimensionally shaped trim part of a motor vehicle having a visible side and a mounting side. The invention also relates to a device for producing a trim part having an injection molding tool that has at least two mold shells which, when assembled, form a chamber with a negative mold of the trim part. The invention also relates to an advantageous use of the device.

Description of the Background Art

Methods for producing trim parts and devices for producing trim parts are known from the prior art. For example, the published patent application DE 10 2014 202 001 A1, which is incorporated herein by reference, discloses the production of a component using what is known as gas assist injection molding. The flowable material is introduced into the chamber of an injection molding tool and an internal gas pressure is generated in the material, which presses the material against the mold shells of the injection molding tool in order to ensure a secure contact. Pressure is thus generated from the inside to the outside, which is to ensure that the contour of the mold shells is completely transferred to the contour of the material in the hardened state. However, this can lead to sink marks on the visible side or outside of the component during the hardening or cooling down if the material deforms as a result of the volume compensation when the material hardens. These sink marks can lead to a reduction in the robustness of the component as a whole and, above all, interfere optically if the component is used as a visible part, in particular as a trim part in the interior or exterior of a motor vehicle.

SUMMARY OF THE INVENTION

It is therefore an object of the present invention to provide an improved method and an improved device which prevent or at least reduce the occurrence of sink marks on the visible side of the trim part.

The method according to the invention has the advantage that sink marks on the visible side of the component are avoided or at least reduced in a simple manner, in particular without mechanical finishing. To this end, the method is designed according to the invention by the following steps: First, the flowable material is introduced into a chamber of an injection molding tool, wherein the injection molding tool has at least two mold shells which, when assembled, form the chamber with a negative mold of the trim part. At least one first of the mold shells forms the visible side of the trim part, that is, forms or defines its visible side mold. In addition, at least one second of the mold shells forms the mounting side of the trim part. The material is hardened in the chamber so that the finished trim part can be removed from the chamber at the end of the process. Because the mold shells already form the negative mold of the trim part, the finished or at least almost finished trim part can be removed from the chamber at the end of the process after the mold shells have been separated from one another. During the hardening of the material in the chamber, according to the invention a gas pressure is generated, which acts in a planar manner between the second mold shell and the material in the chamber, so that the material is pressed away from the surface of the mold shell by the gas pressure. The use of gas as a pressure medium ensures that the pressure automatically acts evenly between the second mold shell and the material, so that it is evenly pressurized, which means that when it hardens and the volume is compensated, the material is deformed in such a way that sink marks do not occur or only occur to a reduced extent. After the hardening has taken place, the trim part is then removed or retrieved from the chamber of the injection molding tool without there being any sink marks or at least any major sink marks on the visible side. A finished or almost finished trim part is thus obtained in a simple manner. If necessary, flash or similar excess material necessary for production or due to production have to be removed from the trim part.

In an exemplary embodiment, the gas pressure is only generated after an initial phase of the hardening has elapsed. This ensures that, first of all, in particular the side of the material facing the first mold shell hardens according to the shape of the mold shell, so that the shape of the visible side no longer changes as a result of the gas pressure subsequently generated. As soon as the hardening has advanced so far that it can be assumed that no or at least no larger sink marks can occur, the gas pressure can also be reduced or removed entirely. As a result, the energy expenditure needed to generate the gas pressure is reduced and overall energy expenditure for producing the trim part is optimized.

Alternatively, the gas pressure is generated until the end of the hardening period in order to ensure that the material does not come back to the mold shell and remains in its final form until it has fully hardened.

Furthermore, it is preferably provided that at least one structural element, in particular a stiffening rib and/or at least one holding projection are molded or formed on the mounting side of the trim part. In this way, the stiffening structure and/or the holding projection can be molded on later or can be molded at the same time during injection molding by the corresponding shape of the mold shell assigned to the mounting side.

Furthermore, it is preferably provided that at least the first mold shell is cooled during the hardening. This accelerates the hardening process, especially on the visible side, so that the gas pressure can be reduced earlier, as soon as the visible side has hardened sufficiently.

The device according to the invention is characterized in that at least one gas pressure channel is assigned to the second mold shell which opens into the chamber in order to generate a gas pressure between the second mold shell and the material located in the chamber and in order to press the material against the first mold shell. This results in the advantages already mentioned above.

The use of the aforementioned device according to the invention provides that the device is used to produce a three-dimensionally shaped trim part of a motor vehicle that has a visible side and a mounting side. This results in the advantages already mentioned above for the trim part.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
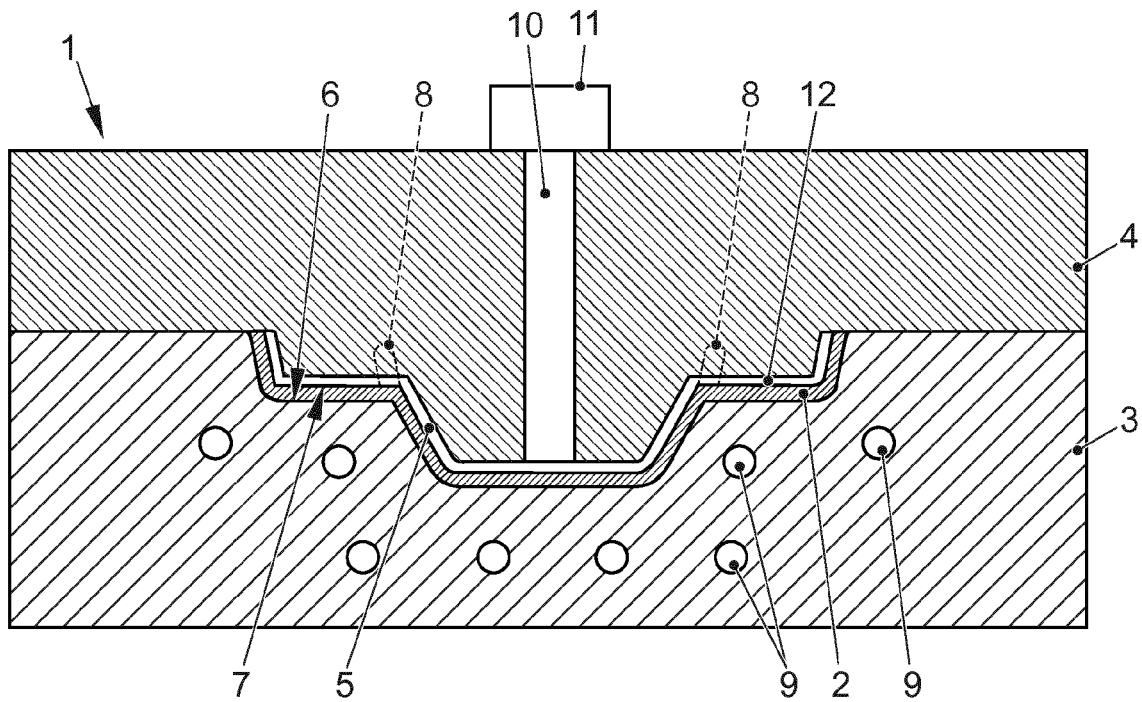
FIG. 1 shows an exemplary device for producing a trim part in a simplified sectional view and FIG. 2 illustrates a flow diagram of an exemplary method for operating the device of FIG. 1.

FIG. 1 shows a simplified illustration of an exemplary embodiment of a device 1 for producing a trim part 2 having a visible side 6 and a mounting side 7.

The device 1 has two mold shells 3 and 4 which are designed to be complementary to one another such that, when they rest on one another at their edge regions, they form between them a chamber 5 which at least substantially corresponds to the negative mold of the trim part 2. According to the present exemplary embodiment, the first mold shell 3 at the bottom in FIG. 1 is assigned to the visible side 6 and the second mold shell 4 at the top in FIG. 1 is assigned to the mounting side 7 of the trim part 2. The mounting side 7 differs from the visible side 6, inter alia, in that it has one or more structural elements 8, which are designed, for example, as stiffening ribs or holding projections, by means of which the trim part 2 can be fastened, for example, to a body or to other structural elements of a motor vehicle. The visible side 6 has a particularly smooth surface, which is assigned as a visible surface, for example, to the vehicle interior of the motor vehicle. In this respect, high demands are made on the visual impression of the visible side, while increased demands are made on the fastening options of the rear mounting side 7, with the visual impression being less relevant.

The first mold shell 3, which is assigned to the visible side 6, also has a plurality of coolant channels 9 through which a coolant can be conveyed in order to cool the mold shell 3. Corresponding coolant channels 9 are also optionally formed in the upper mold shell 4.

In addition, the second mold shell 4 has a gas pressure channel 10, which is connected to a gas pressure source 11, which is shown in simplified form in FIG. 1. A gas pressure can be generated in this gas pressure source 11 and guided to the chamber 5 through the gas pressure channel 10. For this purpose, the gas pressure channel 10 opens into the chamber 5 on the mounting side 7 of the trim part 2.

Figure 2:
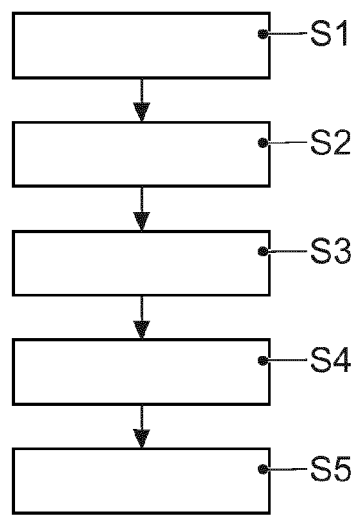

An advantageous method for producing the trim part 2 by means of the device 1 will now be explained with reference to FIG. 2.

In a first step S1, the mold shells 3 and 4 are assembled so that they form the at least substantially closed chamber 5. In a subsequent step S2, a flowable material is introduced into the chamber 5, in particular by means of injection molding. The material is, for example, plastic or a material comprising plastic.

As soon as the material is completely introduced into the chamber 5, a gas pressure is generated in a subsequent step S3 by means of the gas pressure source 11, which gas pressure penetrates through the gas pressure channel 10 between the material and the second mold shell 4 and thereby pressurizes the material in the direction of the first mold shell 3 with a gas. In particular, the gas pressure has a uniform effect over the entire surface of the mounting side 7 of the later trim part 2.

According to a first exemplary embodiment, the gas pressure is generated in step S3, immediately after the material has been introduced. According to a further exemplary embodiment, the gas pressure is only generated after a first hardening of the material has already taken place. Optionally, a coolant is first conveyed through the first mold shell 3 using the coolant channels 9, so that the mold shell 3 facing the visible side 6 cools down and the material in the chamber 5 on the side facing the first mold shell 3 cools down faster than the material on the side facing the second mold shell 4. As a result, the shape of the trim part 2 on the visible side 6 is first partially hardened or completely hardened. According to this exemplary embodiment, the gas pressure is only generated then, so that the material that has already partially hardened or completely hardened is pressed away from the second mold shell 4. This produces a gas pressure chamber 12 in the chamber 5 between the second mold shell 4 and the material or trim part 2, by which the trim part 2 is pressed uniformly against the first mold shell 3 so that warping or the occurrence of sink marks on the visible side 6 of the trim part 2 is prevented or at least reduced. This ensures that the visible side 6 of the trim part 2 has the desired structure and surface quality. The gas pressure is maintained until the trim part 2 is completely hardened. This has the advantage that no sink marks can form in the material on the visible side 6 of the trim part 2 due to changes in volume caused by changes in temperature. The material therefore does not warp on the visible side 6 in the further hardening process. As a result, on the visible side 6, the trim part 2 receives an optimal material quality with an optically high-quality impression and advantageous mechanical properties.

After the material has completely hardened, the mold shells 3, 4 are separated from one another in a step S4 and the finished trim part 2 is removed from the chamber 5 in the subsequent step S5.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for producing a three-dimensionally shaped trim part of a motor vehicle having a visible side and a mounting side, the method comprising:
   injecting a flowable material with pressure into a chamber of an injection molding tool that has at least two mold shells, which, when assembled, form the chamber with a negative mold of the trim part, wherein at least one first mold shell of the at least two mold shells forms the visible side and at least one second mold shell of the at least two mold shells forms the mounting side of the trim part;
   hardening the material in the chamber to form a hardened material;

producing a gas pressure that acts in a planar manner between the at least one second mold shell and the material during the hardening of the material;

removing the hardened material from the chamber of the injection molding tool, the hardened material removed from the chamber being the trim part, wherein the at least one first mold shell is cooled during the hardening of the material, and wherein the at least one first mold shell is provided with coolant channels through which coolant flows to cool the at least one first mold shell during the hardening of the material, such that a side of the material facing the at least one first mold shell cools faster than a side of the material facing the at least one second mold shell.

2. The method according to the claim 1, wherein the gas pressure is only produced after an end of an initial hardening phase of the material.

3. The method according to the claim 1, wherein the gas pressure is produced until an end of a hardening time required for the hardening of the material.

4. The method according to the claim 1, wherein at least one structural element or a stiffening rib and/or at least one holding projection, are molded or formed on the mounting side of the trim part.

\* \* \* \* \*